No. 888,430. PATENTED MAY 19, 1908.
C. SOLEMSLIE.
MITER BOX.
APPLICATION FILED SEPT. 19, 1906.
2 SHEETS—SHEET 1.
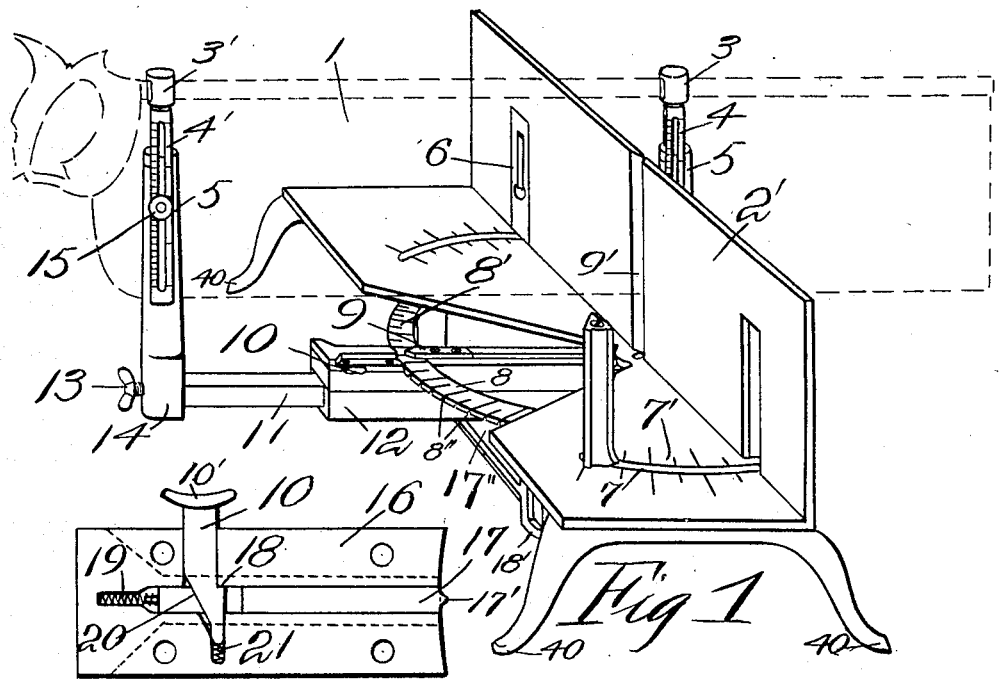
Fig 1.
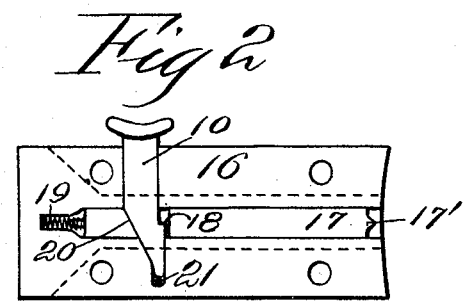
Fig 2.
Fig 3.
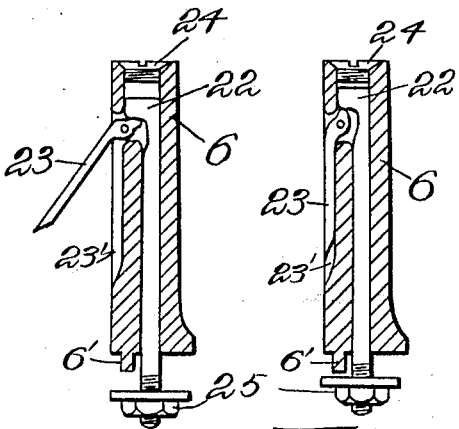
Fig 4. Fig 5.
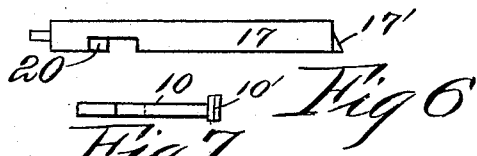
Fig 6.
Fig 7.
WITNESSES
John M. Redmond,
E. J. Horton
INVENTOR
Carl Solemslie
BY Paul A. Tolhox
His ATTORNEY No. 888,430. PATENTED MAY 19, 1908.
C. SOLEMSLIE.
MITER BOX.
APPLICATION FILED SEPT. 19, 1906.
2 SHEETS—SHEET 2.
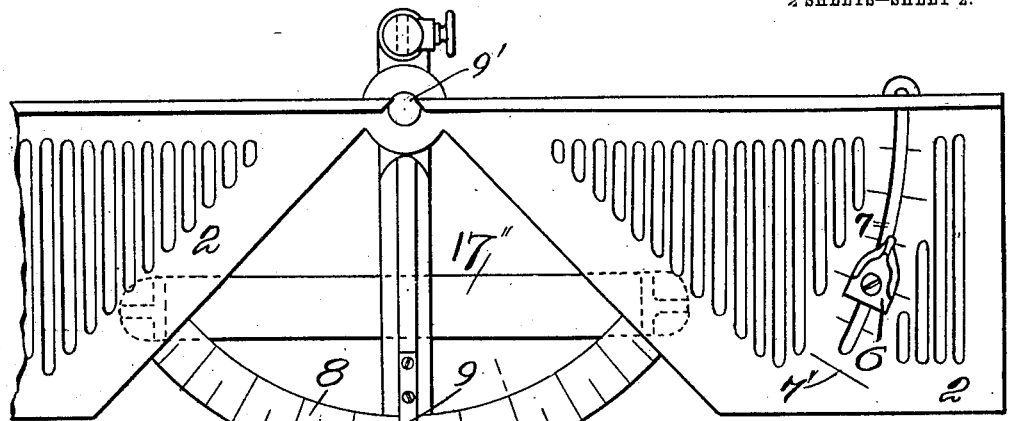
WITNESSES
John M. Redmond.
E. S. Horton
INVENTOR
Carl Solemslie
BY Paul A. Fall
His ATTORNEY

UNITED STATES PATENT OFFICE.

CARL SOLEMSLIE, OF SEATTLE, WASHINGTON.

MITER-BOX.

No. 888,430.  Specification of Letters Patent.  Patented May 19, 1908.

Application filed September 19, 1906. Serial No. 335,333.

*To all whom it may concern:*

Be it known that I, CARL SOLEMSLIE, a citizen of the United States, residing at 1001 Pine street, in the city of Seattle, county of King, State of Washington, have invented new and useful Improvements in Miter-Boxes, of which the following is a concise and clear description.

My invention relates to improvements in miter boxes in which the guides and bars are so mounted as to be adapted to swing a saw which is slidably mounted therein to any desired angle by pressing a button. The said guides being adapted to be raised or lowered as the saw advances in its cut to a point indicated by a scale attached to uprights supporting the said guides. One of the said guides which is nearest the saw handle is provided with an extension bar adapted to permit the operator to saw a board of more than the usual width. The table is also preferably provided with a device for sawing angles less than 45 degrees and by the construction hereinafter set forth and illustrated in the accompanying drawings, may be set back and out of the way without a portion projecting any great distance to the rear of my device and thus apt to become broken.

The object of my invention is to provide a miter box which may readily be adjusted to any angle by merely pressing on a projecting finger button, and one which will saw a wide board when desired, by merely loosening a thumb screw at the base of the guide and upright nearest the saw handle, and pulling the said guide towards the said handle and away from the other guide herein set forth and illustrated in the accompanying drawings.

Another object is to provide a means for sawing angles less than 45 degrees without relying on parts which are exposed and are in most instances apt to become damaged by even ordinary usage.

I accomplish these objects by the construction illustrated in the accompanying drawings in which Figure 1 is a perspective view of my device, showing a saw in place. Fig. 2 is a bottom view of the angle adjusting means. Fig. 3 is bottom view showing the said angle adjusting means in its retracted position. Fig. 4 is a vertical section through the center of the table guide, showing the said guide in the position permitting the said guide to be removed and adjusted to the desired angle. Fig. 5 is a section similar to Fig. 4 showing the said table guide in its clamped position. Fig. 6 is a side elevation of the catch bar. Fig. 7 is a side elevation of the finger button and press rod. Fig. 8 is a fragmentary plan view of my device showing the guide nearest the saw handle in its extended position. Fig 9 is a section at 9 Fig. 8. Fig. 10 is a fragmentary section of the end of the extension clamp in its retracted position. Fig. 11 is a fragmentary section of the extension clamp in its extended position. Fig. 12 is a front elevation of the guide nearest the saw handle. Fig. 13 is a section at 13 Fig. 12. Fig. 14 is a plan view of the guide bar, and showing the guide nearest the saw handle in an extended position. Fig. 15 is a side elevation of the guide bar, and guides. Fig. 16 is a section at 16 Fig. 15. Fig. 17 is a fragmentary view showing the preferred form of stiffening member.

Similar reference numerals refer to similar parts throughout the several views in the accompanying drawing.

I have provided a miter box having a bed 2 having a back 2' and provided with apertures adapted to receive table guides 6, and to protect the said table guides 6 from becoming broken and damaged while not in use, the bed 2 is provided with a guide slot 7 adapted to receive a tightening bolt 22 which is contained in the said table guide 6 and is actuated by means of a lever 23, the said tightening bolt may be adjusted to clamp the said guide pieces at any place along the said slot 7, the position may be determined by a scale 7', designating the number of degrees the board to be sawed is held by the table guide 6 from the said back 2'. The tension necessary to clamp the said guide pieces 6 to the bed piece 2 may be regulated by a nut 25, adapted to fit a thread portion of the tightening bolt 22 which is adjusted on the said tightening bolt 22 to cause the said table guides 6 to be locked when the lever 23 is in a recess 23' which is in the face of the said guide piece 6 and adapted to permit the said lever 23 to rest therein and become flush with exposed surface of the said table guides 6. I have also provided on the lower end of the said guide pieces 6 a guide pin 6' which is adapted to prevent the table guides 6 from turning on the said tightening bolt 22. The upper end of the aperture adapted to receive the tightening bolt 22 is preferably plugged with a counter sunk screw 24. By the construction illustrated and set forth it will be seen that the table guides 6 when not in use will be entirely protected by the back 2′, and that when it may be desired to saw a board at an angle less than 45 degrees the corner of the said board may be placed against a center notch 9′, as well as one of the said table guides 6 thus causing the board to be sawed at substantially the number of degrees indicated by scale 8 minus the number of degrees indicated by the aforesaid scale 7′ as for an example, if the table guides 6 are set at 30 degrees and the bar 12 and guides 3 and 3′ which support the saw 1 are set at 45 degrees as indicated by a pointer 9 by subtracting the 30 degrees from the 45 degrees it is obvious that the board will have been cut at an angle of 15 degrees the said bar 12 may be swung to 45 degrees either right or left and will be held in alinement to the exact number of degrees by means of a catch bar 17 having the catch 17′ adapted to engage in notches 8″. The said catch bar 17 is operated by means of a press rod 10 provided on its one end with a finger button 10′ and on its other end with an inclined surface 20 adapted to act upon a like incline surface provided in a notch in the said catch bar 17, the catch bar 17 being held against the said incline surface 20 by means of a spring 19, the said press rod 10 is provided with a shoulder 18 adapted to prevent the said catch rod from being thrust outwardly by means of a press bar spring 21 further than desired. It is obvious that by pressing the button 10 that the spring 19 and press bar spring 21 held in the catch frame piece 16 will be over come, and the catch 17′ will be removed from the notches 8″ thus permitting the bar to be swung to the desired position on the said scale 8′. I have provided a means for sawing boards of more than usual width by moving the guide 3′ away from the guide 3 which may be done by unscrewing the thumb screw 13 thus permitting a wedge rod 28 to permit the clamp pieces 26 and 27 to be withdrawn from the inner surface of the bar 12 which is grooved to permit a slide bar 11 which is secured to the upright 5 at 14, to travel therein. The bar 12 is preferably secured to a top bar 29 which is provided on its under surface with a groove 30 adapted to permit a pin 31 to travel therein and to prevent the said slide bar 11 from being withdrawn from the said bar 12 and has top bar 29 secured to its upper surface as well as the pointer 9 and a catch frame piece 16 which is provided with the press rod 10 and the several parts operated thereby as above set forth. I have provided a stiffening member 17″ which is secured or cast integral to the under surface of the bed 2 and is provided with feet 18′ which act in conjunction with the feet 40 which are secured to the end of the bed 2. The guides 3 and 3′ are preferably provided with a scaled adjustment which consists of a slotted vertically disposed scale pieces 4 and 4′ which are secured to uprights 5 by means of the screws 15.

Having thus described my invention what I claim as new and desire to secure by Letters Patent in the United States is,

1. In a miter box, a bar 12, a bed 2 pivotally supporting said bar, a slide bar 11 slidably adjustable in said bar 12, clamp pieces, a wedge rod adapted to force said clamp pieces against the inner surface of said bar 12, guides 3 and 3′ vertically adjustably mounted on said bar 12 and said bar 11, a scale secured to said guides 3 and 3′ means whereby said guides may be adjusted as indicated by the scale.

2. In a miter box, vertically adjustable guides adapted to receive a cabinet saw, means whereby the depth of the kerf of the saw may be indicated, a bar 12, a slide bar 11 slidably fitting in the surface thereof, clamp pieces, a wedge rod adjusted by thumb screws to force said clamp pieces against the inner surface of said bar 12 to lock said slide bar 11 in the desired position.

3. In a miter box, vertically adjustable guides adapted to receive a cabinet saw, means whereby the kerf of the saw may be indicated, a bar 12, a slide bar 11 slidably fitting in the surface thereof, clamp pieces, a wedge rod adjusted by thumb screws to force said clamp pieces against the inner surface of said bar 12 to lock said slide bar 11 in the desired position, a stiffening member disposed relatively below said bar 12 provided with feet 18′ to co-act with feet 40 and stiffening the bed 2.

4. In a miter box a bar 12 pivotally mounted to the bed 2 said bar 12 adapted to support a slide bar 11 which is provided with a clamp pieces 26 and 27 actuated by means of a wedge rod 28 and thumb screw 13, adapted to clamp the said slide bar 11 in any desired position means for preventing the said slide bar 11 from being withdrawn from the bar 12, the said bar 12 also being provided with a top bar 29, said slide bar 11 and top bar 29 adapted to support up-rights 5 and the guides 3 and 3′ substantially as and for the purpose set forth.

5. In a miter box, a bed, a back, legs secured thereto, a bar 12 pivotally mounted on said back, a stiffening member substantially under said bar, a scale piece 8 concentric with the pivot of said bar 12 and adapted to co-act with said stiffening member to insure rigidity of said bed, a pointer 9 projecting over said scale piece 8 and resting thereon to co-act with said pivotal connection of said bar 12 as a support thereof, notches 8″ provided in said scale piece 8, a catch 17′ co-acting with said notches to lock said bar 12 and parts secured thereto at a predetermined angle relative to said back, a press rod having an inclined surface, a catch bar 17 provided with a similar inclined surface co-acting with said press rod to retract said catch 17' permitting a free travel of said bar 12.

6. In a miter box a bar 12 pivotally mounted to the bed 2 said bar 12 adapted to support a slide bar 11 which is provided with clamp pieces 26 and 27 actuated by means of a wedge rod 28 and thumb screw 13 adapted to clamp the said slide bar 11 at any desired position, means for preventing the said slide bar 11 from being withdrawn from the bar 12 the said bar 12 also being provided with a top bar 29 the said slide bar 11 and top bar 29 supporting uprights 5 and the guides 3 and 3'; the said guides 3 and 3' being provided with slotted vertically disposed scale pieces 4 and 4' adapted to prevent the said guides 3 and 3' from permitting the saw which travels therein from sawing a deeper cut than desired and as indicated by the said slotted vertically disposed scale pieces substantially as and for the purpose set forth.

7. In a miter box, a bed, a back, legs secured thereto, a bar 12 pivotally mounted on said back, a stiffening member substantially under said bar, a scale piece 8 concentric with the pivot of said bar 12 and adapted to co-act with said stiffening member to insure rigidity of said bed, a pointer 9 projecting over said scale piece 8 and resting thereon to co-act with said pivotal connection of said bar 12 as a support thereof, notches 8'' provided in said scale piece 8, a catch 17' co-acting with said notches to lock said bar 12 and parts secured thereto at a predetermined angle relative to said guide, a press rod having an inclined surface, a catch bar 17 provided with a similar inclined surface co-acting with said press rod to retract said catch 17' permitting the free travel of said bar 12, a button secured to said press rod in a convenient place to operate said catch 17', a spring 21 adapted to retract said press rod 10 and the spring 19 adapted to force said catch 17' into said notches 8''.

In testimony whereof I have signed my name to this specification in the presence of two subscribing witnesses.

CARL SOLEMSLIE.

Witnesses:
B. B. HUFFMAN,
JOHN M. REDMOND.